Dec. 13, 1955 E. H. HECKETT 2,726,815
IMPACT APPARATUS FOR CLEANING METAL SCRAP AND THE LIKE
Filed June 25, 1952 3 Sheets-Sheet 2

INVENTOR
ERIC H. HECKETT

BY *Francis J. Klempay*
ATTORNEY

Dec. 13, 1955  E. H. HECKETT  2,726,815
IMPACT APPARATUS FOR CLEANING METAL SCRAP AND THE LIKE
Filed June 25, 1952  3 Sheets-Sheet 3

INVENTOR
ERIC H. HECKETT

BY *Francis J. Klempay*
ATTORNEY

2,726,815

IMPACT APPARATUS FOR CLEANING METAL SCRAP AND THE LIKE

Eric H. Heckett, Valencia, Pa., assignor to Heckett Engineering, Inc., Butler, Pa., a corporation of Ohio Application June 25, 1952, Serial No. 295,461

2 Claims. (Cl. 241—91)

This invention relates to improved method and apparatus for cleaning metal scrap and the like and more particularly to an improved tumbler barrel construction as well as to improved arrangements for feeding the material to be cleaned to and through the tumbler barrel and for discharging the cleaned material while disposing of the waste fines separated therefrom in the cleaning process. The invention has as its primary object the provision of apparatus of this general nature having extreme ruggedness and durability and being of greatly increased capacity by reason of large physical size and improved arrangements for effecting the flow of materials with respect thereto as indicated whereby the apparatus may be operated in a continuous and economical manner. The apparatus of this invention specifically for substantially continuous use in connection with operations for the recovery of reusable metal scrap from the slag and refuse resulting from steel making operations such as is disclosed and claimed in my prior U. S. Patents No. 2,264,204, issued November 25, 1941, and No. 2,352,712, issued July 4, 1944. As stated in these patents and/or in my co-pending application Ser. No. 300,314, filed July 22, 1952, substantial quantities of reusable scrap metal are contained in the slag and in the general refuse previously discarded and dumped by most of the steel making plants and my general object has been to develop improved plant facilities and improved methods of operation of such plant facilities whereby this reusable scrap metal may be recovered from such slag and refuse in a practical and economical manner for conservative reuse in the blast furnaces and steel making furnaces of the basic steel producers. A substantial portion of the reusable metal scrap pieces are encrusted with hard slag and with hard masonry materials, both having highly tenacious adherence and the prior difficulty and expense of removing these adulterants to bring the metal content of the scrap up to percentages acceptable for reuse in the furnaces has resulted in the loss of substantial metal tonnages by the discarding and dumping of these materials by the basic steel producers.

Another object of the invention is the provision of improved apparatus capable of carrying out slag recovery procedures in an economical and expeditious manner whereby the apparatus may be employed in a practical manner as a permanent adjunct of a steel producing plant. These general objects are accomplished, in accordance with the principles of the invention, by providing a cleaning apparatus of such physical size, strength and durability that the same may be operated continuously to clean an endless stream of the heavy lumpy and irregularly shaped pieces of the material specified.

A more specific object of the invention resides in the provision of an improved tumbler barrel apparatus having essentially square or rectangular side walls so that during rotation of the barrel the material therein is subjected to a continuous impacting process, the barrel being supported between its ends by circumscribing ring-like bearing members, and being particularly characterized by the provision of longitudinally extending beam-like reinforcing members which extend along the outer surface of the side wall plates of the barrel and which are circumscribed by the ring-like bearing members. This arrangement affords a highly compact and practical structure which is capable of withstanding the torturing impact forces resulting from the continuous tumbling of large steel bearing slag lumps.

The above and other objects and advantages of the invention will become apparent upon consideration of the following detailed specification and accompanying drawing wherein there is disclosed a preferred embodiment of the invention.

Figure 1:
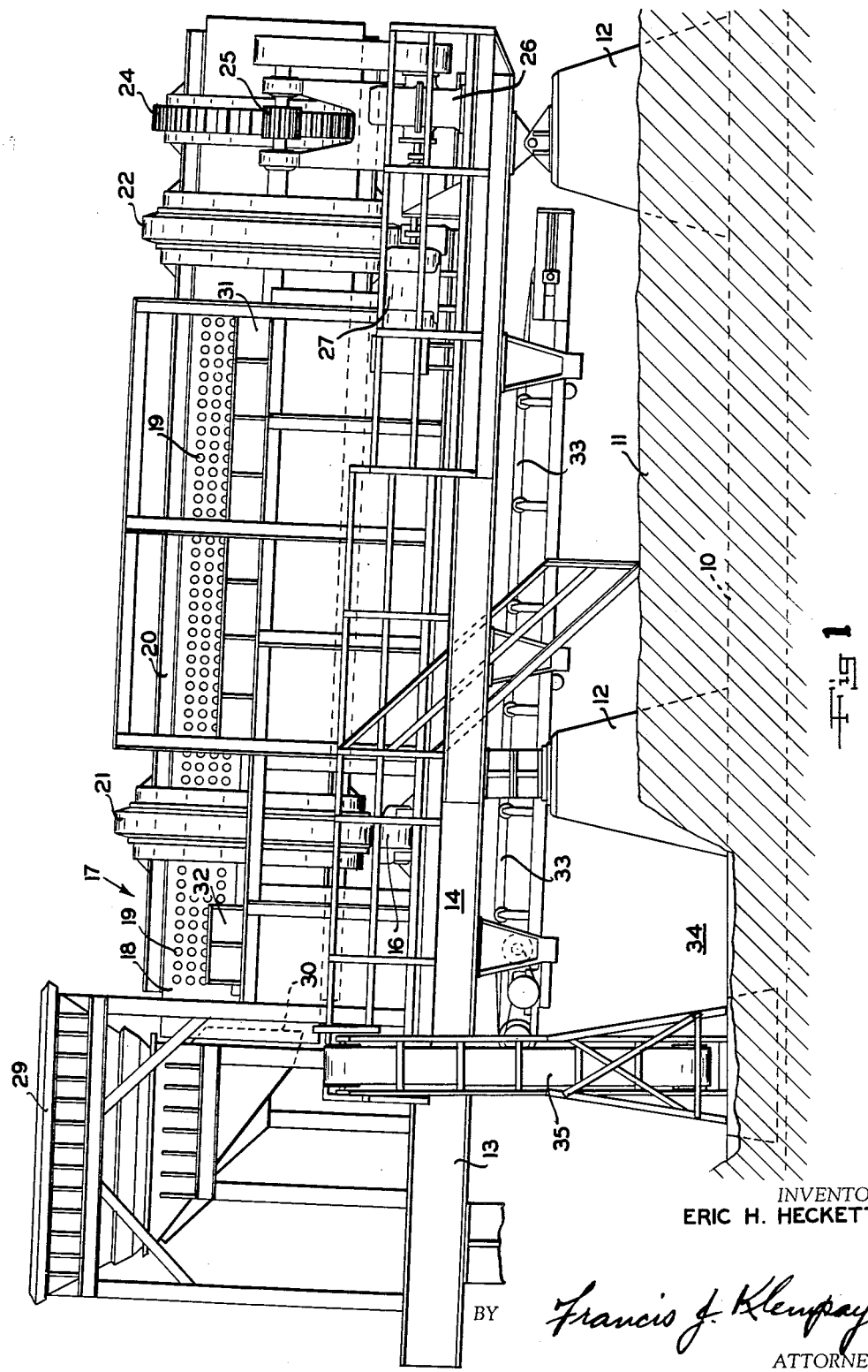
Figure 1 is a side elevation of a continuous tumbler barrel, with appurtenances, all as constructed in accordance with, and for the purposes advanced by my invention.
Figure 2:
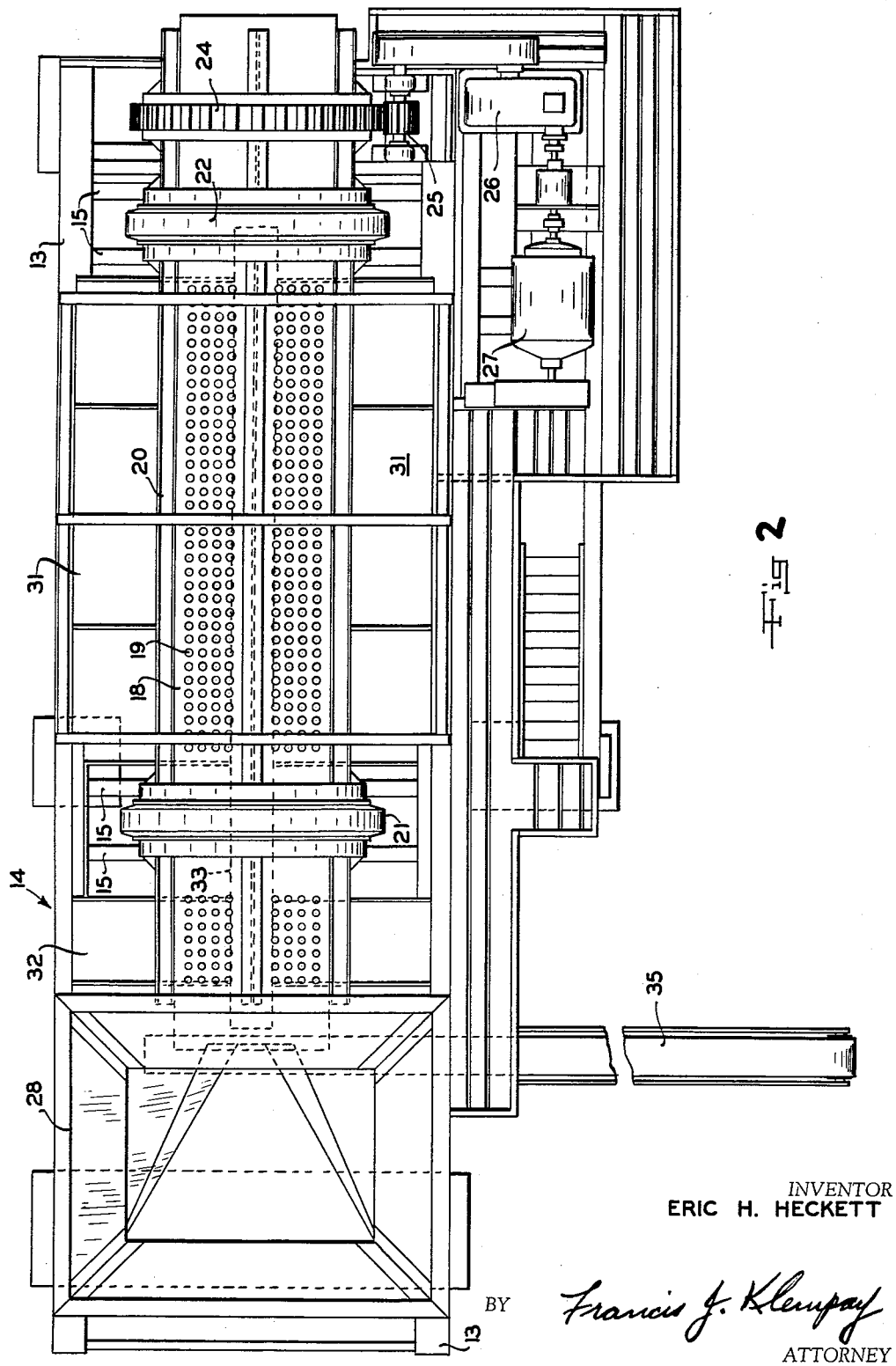
Figure 2 is a top plan view of the apparatus of Figure 1.

Referring now to the drawings, the tumbler barrel apparatus comprises a heavy concrete foundation 10 which is firmly embedded in the soil 11 of the slag dump area. Supported on the foundation 10, on a plurality of piers 12 extending upwardly therefrom, is a framework of structural members, including longitudinally disposed beams 13, which forms a supporting platform 14 for the tumbler barrel proper and certain equipment appurtenant thereto. Spaced longitudinally on the supporting platform 14, and mounted on transversely disposed structural members 15 thereof, are spaced pairs of heavy-duty supporting rolls 16 which serve to rotatably support an elongated drum or tumbler barrel 17 to be more fully described.

Figure 3:
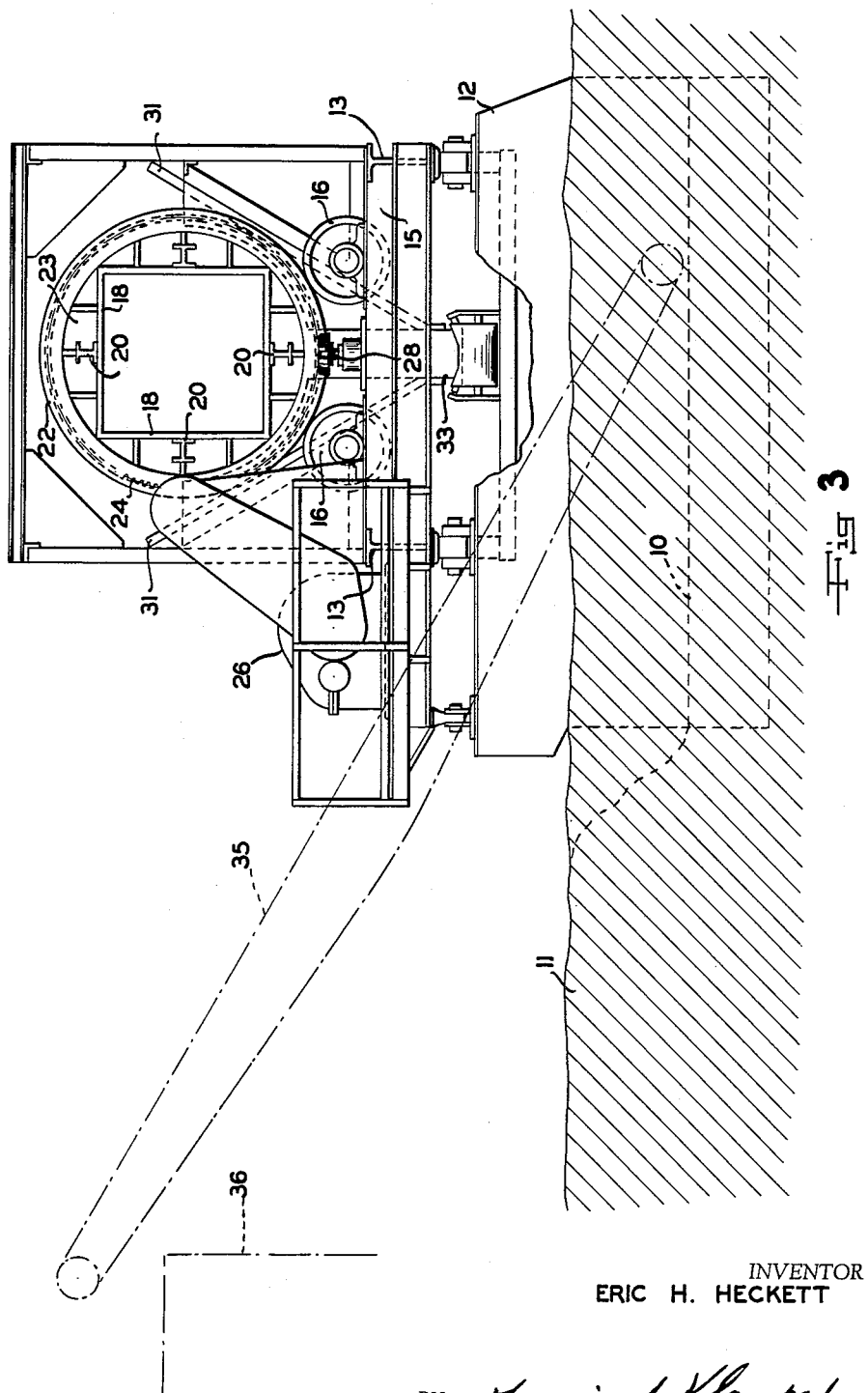
Figure 3 is an end elevation of the apparatus of Figure 1.

In accordance with the teachings of the invention the tumbler barrel 17 is preferably of rectangular or multiple-sided tubular cross section as illustrated in Figure 3, comprising four elongated substantially flat side members 18 of heavy steel plate having therein a large number of apertures 19 of predetermined size, depending on such factors as the nature of the slag material to be treated therein and the end product desired. An aperture size in the order of two inches is presently contemplated.

Positioned inwardly of the ends of the barrel 17 and spaced equally with the supporting rolls 16 are ring-like bearing members 21 and 22 which are rigidly secured to the side plates 18, in circumscribing relation thereto, by suitable webbing 23 whereby the barrel 17 may be supported by and rotated on the rolls 16 in the manner desired for "tumbling" a magnetic slag charge contained therein and thereby breaking away the reusable steel particles from the slag and/or masonry crust. In accordance with the desired ends of the invention the apertures 19 should be of suitable size of to permit passage from the barrel 17, during rotation thereof, of substantially all loose and broken waste slag material and also small particles of free and slag incrusted steel, commonly termed magnetic fines, which are generally not suited for recharging in an open hearth furnace. Hence, if the operation is properly carried out, there is discharged from the open end of barrel 17 the larger particles of free reusable steel, along with, in some cases, larger particles of free slag from which the metallics may be readily separated by the simple expediency of picking up the metallics with a magnetic crane, not shown.

As will be readily understood, the slag and refuse material which will generally be passed through the tumbler barrel will be of a bulky, heavy nature. Thus, during the tumbling operation, as the material is caused to strike the side walls of the barrel with heavy impact forces, the side wall plates are subjected to extraordinary stresses and strains. In accordance with the teachings of the invention, therefore, I position the bearing rings 21 and 22 intermediate the ends of the barrel and provide a plurality of I-beam type reinforcing members 20 which extend longitudinally of the side wall plates 18, intermediate the side edges thereof, and positioned between the outer surfaces of the side wall plates 18 and the bearing rings 21 and 22. The arrangement is such that the reinforcing beams 20 are restrained at spaced points by the rings 21 and 22 against radial expanding movements such as would tend to be caused by the outward forces of the tumbled material, and this radial restraint is imparted to the whole of the side wall plate through the longitudinal reinforcement of the beams. The arrangement thus provided is neat, economical and highly compact, as will be readily apparent in Figure 3, while affording the rugged structural characteristics found to be necessary and desirable in apparatus of this general character.

In the improved tumbler barrel installation herein illustrated, the barrel 17 is open at both ends and may be inclined at an angle of, for example, three degrees from the horizontal so that upon a charge of steel-bearing slag being fed into the upper end of the barrel and upon subsequent rotation thereof, the material will be fed by the action of gravity along the barrel until the material reaches the discharge end of the barrel, whereupon it may be directed or conveyed into a suitable railroad car, not shown, or merely discharged onto the ground to be subsequently picked up and loaded onto a car or truck by a magnetic crane, also not shown. The length and inclination of the barrel 17 are, of course, determined in accordance with the volume and composition of the metal bearing slag material to be processed at the particular installation so that it is inherent in the apparatus that the charge be sufficiently processed as it passes by gravity feed from one end to the other of the barrel.

In the illustrated embodiment of the tumbler barrel apparatus the barrel 17 is rotated in the manner desired by means of a large ring gear 24 which is positioned concentrically about the barrel 17 near the discharge end thereof and which cooperates with a pinion gear 25 carried by the supporting platform 14. The pinion gear 25 is driven through a speed reducing gear box 26 by means of an electric motor 27 or other suitable prime mover. And it is presently contemplated that the barrel 17 will be rotated at a speed in the order of ten to fifteen revolutions per minute. The barrel 17 is prevented from moving longitudinally during rotation by means of one or more anti-friction thrust rollers 28 carried by the supporting platform 14 and adapted to engage the forward or right hand axial edge of the ring 22 and/or the ring 21.

For charging the tumbler barrel 17 with metal bearing material I have provided adjacent the upper or charging end of the barrel a large hopper 29 having a discharge opening 30 positioned within the mouth of the barrel 17 so that the material may be merely dropped into the hopper by suitable conveyor or crane apparatus, not shown. Preferably, a crane, not shown, positioned centrally intermediate the ends of the tumbler barrel apparatus is used for charging, since the same crane may also be used for picking up the discharged material if desired.

According to the desired plan of steel plant operation, the fines, or small material, both magnetic and non-magnetic, passing through the apertures 19 during processing of the principal slag charge are collected and transported to another processing station wherein the fines are separated into non-metallic waste material and metallic material suitable with, and often without additional processing for reuse in the blast furnaces of a steel making plant; it being understood that a substantially greater amount or proportion of slag may be present in a blast furnace charge than in an open hearth charge.

To collect the fines in a most expeditious manner I have provided angularly disposed deflecting plates 31 and 32 along the lower side of the barrel 17, which plates are longitudinally coextensive with the apertures 19 and arranged to converge below the barrel 17 so that all material passing through the apertures 19 will be collected and caused to drop through a longitudinally disposed opening between the lower extreme edges of the plates 31 and 32. Longitudinally aligned with the above mentioned opening and positioned immediately below the same is a continuous conveyor belt 33 which is arranged to collect and convey the fine material toward the charging end of the apparatus and to there deposit the material in a pit 34. Leading from the pit 34 to a point substantially removed from the tumbler barrel apparatus is a second conveyor 35 which is arranged to convey the fine material collected in the pit 34 to a gondola car 36, if desired, or to a suitable separating station, not shown, including means for discriminating and separating metallic from non-metallic fine particles.

It should thus be apparent that I have accomplished the objects initially set forth. The invention disclosed herein provides an improved tumbler barrel apparatus which is uniquely adapted for use in the impact cleaning and processing of slag material resulting from steel plant operations so that the metal content of the slag may be separated from the encrusting slag and thereby recovered for subsequent reuse in the furnaces.

Of particular importance in the present invention is my novel arrangement for reinforcing the side wall portions of the tumbler barrel to withstand the heavy impact forces to which the barrel is subjected during normal operation in the cleaning of steel-bearing slag particles. I provide for this purpose a novel arrangement wherein a plurality of I-beam or similar structural reinforcing members are disposed longitudinally along the side walls of the barrel, with the side walls and reinforcing members being circumscribed by ring-like bearing members by means of which the barrel is rotatably supported. Thus, the circumscribing ring-like members prevent radial expansion of the reinforcing beams, while this same preventative or restraining force is imparted to the whole of the tumbler barrel through the anti-bending characteristics of the I-beam members.

It should be understood, however, that the specific embodiment herein disclosed is intended to be illustrative only, as certain obvious changes may be made therein without departing from the clear teachings of the invention. Reference should thus be made to the following appended claims in determining the full scope of the invention.

I claim:

1. An impact apparatus for continuously recovering free steel particles from steel bearing slag particles comprising an elongated barrel-like member of continuous substantially uniform rectangular cross section, said barrel-like member having open ends and perforated heavy flat plate-like side walls and being adapted to receive material to be broken, a supporting frame, roller means on said frame spaced substantially inwardly from the ends of said barrel-like member for rotatably supporting the same, ring-like bearing members mounted rigidly in circumscribing relation about said barrel-like member substantially inwardly of the ends thereof, said bearing members being adapted to engage said roller means, heavy longitudinally extending reinforcing beams secured to the side walls of said barrel-like member intermediate the sides edges of the respective walls and being substantially coextensive with said side walls, said beams being circumscribed by and rigidly secured to said bearing members, and web plate means secured between said side walls and said bearing members and including a portion radially outward of said reinforcing beams, and drive means for rotating said barrel-like member including a large ring-like gear positioned adjacent one of said bearing members in circumscribing relation to said barrel-like member and said beams, said side walls having imperforate areas coextensive with said bearing members and said gear.

2. An impact apparatus for continuously recovering free steel particles from steel bearing slag particles comprising an elongated barrel-like member of continuous substantially uniform multiple-sided tubular cross section, said barrel-like member having open ends and perforated heavy flat plate-like side walls and being adapted to receive material to be broken, a supporting frame, roller means on said frame spaced substantially inwardly from the ends of said barrel-like member for rotatably supporting the same, ring-like bearing members mounted rigidly in circumscribing relation about said barrel-like member substantially inwardly from the ends thereof, said bearing members being adapted to engage said roller means, heavy longitudinally extending reinforcing beams secured to the side walls of said barrel-like member intermediate the side edges of the respective walls and being substantially coextensive with said side walls, said beams being circumscribed by and rigidly secured to said bearing members, and web plate means secured between said side walls and said bearing members and including a portion radially outward of said reinforcing beams, and drive means for rotating said barrel-like member including a large ring-like gear positioned adjacent one of said bearing members in circumscribing relation to said barrel-like member and said beams, side walls having imperforate areas coextensive with said bearing members and said gear.

References Cited in the file of this patent
UNITED STATES PATENTS

| | | |
|---|---|---|
| 143,745 | Bradford | Oct. 21, 1873 |
| 387,158 | Freygang | July 31, 1888 |
| 401,878 | Dodge | Apr. 23, 1889 |
| 705,870 | Sanders | July 29, 1902 |
| 1,697,531 | Levitt | Jan. 1, 1929 |
| 1,859,560 | Hartshorn | May 24, 1932 |
| 1,966,312 | Rafetto | July 10, 1934 |
| 2,189,711 | Ergenbrot | Feb. 6, 1940 |
| 2,264,204 | Heckett | Nov. 25, 1941 |
| 2,423,994 | Petersen | July 15, 1947 |

FOREIGN PATENTS

| | | |
|---|---|---|
| 12,058 | Great Britain | of 1848 |